(12) United States Patent
Schliebe et al.

(10) Patent No.: US 6,312,061 B1
(45) Date of Patent: Nov. 6, 2001

(54) STRUCTURE FOR MOUNTING A CLUSTER OF PRESSURE SENSORS UPON AN ELECTRO-HYDRAULIC BRAKE SYSTEM CONTROL UNIT

(75) Inventors: Paul M. Schliebe, Dexter; Charles Darnell, Ypsilanti; Edward R. Hornback, Dexter; Clark E. Lowman, Ann Arbor, all of MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 09/448,116

(22) Filed: Nov. 24, 1999

Related U.S. Application Data
(60) Provisional application No. 60/109,913, filed on Nov. 25, 1998.

(51) Int. Cl.$^7$ .................................................. B16T 13/66
(52) U.S. Cl. ............................................. 303/20; 73/756
(58) Field of Search .................... 309/20, 870.13, 309/870.11, 870.16; 338/4; 73/756, 715, 721, 727, 706, 720, 726, DIG. 4

(56) References Cited

U.S. PATENT DOCUMENTS

| | | | |
|---|---|---|---|
| 4,108,008 | * | 8/1978 | Jowett ..................................... 73/756 |
| 4,442,716 | * | 4/1984 | Coe ......................................... 73/756 |
| 4,753,105 | * | 6/1988 | Juanarena .................................. 73/4 |
| 4,939,497 | * | 7/1990 | Nishida .................................... 388/4 |
| 5,003,818 | | 4/1991 | Hoodenpyle et al. . |
| 5,070,732 | | 12/1991 | Duncan et al. . |
| 5,163,328 | | 11/1992 | Holland et al. . |
| 5,277,067 | | 1/1994 | Holland et al. . |
| 5,414,416 | | 5/1995 | Yamakita et al. . |
| 5,507,171 | | 4/1996 | Mattes et al. . |
| 5,866,822 | | 2/1999 | Willig . |
| 6,007,162 | | 12/1999 | Hinz et al. . |

FOREIGN PATENT DOCUMENTS

| | | |
|---|---|---|
| 297 14 229 U1 | 11/1997 | (DE) . |
| 197 11 366 A1 | 9/1998 | (DE) . |
| WO 96 33081 A | 10/1996 | (WO) . |
| WO 97 00433 A | 1/1997 | (WO) . |
| WO 99 30943 A | 6/1999 | (WO) . |
| WO 99/39171 A1 | 8/1999 | (WO) . |
| WO 99 50115 A | 10/1999 | (WO) . |

* cited by examiner

Primary Examiner—Christopher P. Schwartz
Assistant Examiner—C. T. Bartz
(74) Attorney, Agent, or Firm—MacMillan, Sobanski & Todd, LLC

(57) ABSTRACT

A plurality of pressure sensors are carried in housing mounted upon a hydraulic control valve for an electro-hydraulic brake system. The pressure sensors are electrically connected to a signal conditioning circuit which also is mounted upon the hydraulic control valve. The signal conditioning circuit samples the sensors and mulitplexes the sensor signals into a single output signal.

46 Claims, 14 Drawing Sheets

BLOCK DIAGRAM FOR PRESSURE SENSOR CLUSTER (PSC)

BLOCK DIAGRAM FOR PRESSURE SENSOR CLUSTER (PSC)

STRUCTURE FOR MOUNTING A CLUSTER OF PRESSURE SENSORS UPON AN ELECTRO-HYDRAULIC BRAKE SYSTEM CONTROL UNIT

CROSS REFERENCE TO RELATED APPLICATIONS

This application claims the benefit of U.S. Provisional Application No. 60/109,913, filed Nov. 25, 1998.

BACKGROUND OF THE INVENTION

This invention relates in general to electro-hydraulic brake systems and in particular to a structure for mounting a cluster of pressure sensors upon an electro-hydraulic brake system control unit.

An electro-hydraulic brake system (EHB) combines the advantages of an electric braking system with components of a conventional hydraulic brake system. Thus, an EHB can be considered as an intermediate hybrid system which includes features of both a conventional hydraulic brake system and a brake by wire system (BBW). By utilizing conventional hydraulic brake components, development and conformance costs and times are reduced.

Referring now to FIG. 1, there is shown, generally at 10, a typical EHB. The EHB 10 includes a pedal unit 11 which is hydraulically connected to a hydraulic control unit (HCU) 12. The hydraulic control unit 12 forms an interface between the pedal unit 11 and a pair of conventional hydraulically actuated vehicle front wheel brakes 13 and a pair of conventional hydraulically actuated vehicle rear wheel brakes 14.

The pedal unit 11 includes a tandem master cylinder 15 which is supplied with brake fluid from a master cylinder reservoir 16. The master cylinder 15 is connected by a conventional mechanical linkage to a vehicle brake pedal 17. The brake pedal 17 also is coupled to a displacement transducer 18 which generates an electrical signal having an amplitude which is proportional to brake pedal travel. One chamber of the master cylinder 15 is connected by a first hydraulic brake line 19 while the other chamber of the master cylinder 15 is connected to a second hydraulic brake line 20. The pedal unit 11 also includes a normally closed valve 21 which connects the first brake hydraulic brake line 20 circuit to a pedal travel simulator 22. The pedal travel simulator 22 is an electro-hydraulic device which is operative during operation of the EHB 10 to provide brake pedal resistance and force as feedback to the vehicle operator.

The HCU 12 includes a first normally open isolation valve 23 which is connected between the first hydraulic brake line 19 and one of the front wheel brakes 13 and a second normally open isolation valve 24 which is connected between the second hydraulic brake line 20 and the other of the front wheel brakes 13. Each of the front wheel brakes 13 is connected through an isolator piston 25 to a pair of proportional control valves 26 whose purpose will be explained below. The second valve of each pair of proportional control valves 26 is connected to a corresponding rear wheel brake 14. The isolator pistons 25 hydraulically isolate the front wheel brakes 13 from the rear wheel brakes 14. As shown in FIG. 1, the front wheel brakes 13 are hydraulically connected through a first balance valve 27. Similarly, the rear wheel brakes 14 are hydraulically connected through a second balance valve 28.

The HCU 12 further includes a motor driven pump 35 as a source of pressurized brake fluid for actuation of the wheel brakes 13 and 14. The pump 35 has an intake port which draws brake fluid through a hydraulic line 36 from the master cylinder reservoir 16. The pump 35 also has a discharge port which is connected through each of the proportional control valves 26 to a corresponding front or rear wheel brake 13 or 14. Each of the proportional control valves 26 includes a discharge port which is connected though a hydraulic discharge line 38 to the master cylinder reservoir 16. The discharge port of the pump 35 also is connected through a relief valve 39 to a high pressure accumulator 40.

A plurality of pressure sensors are included in the EHB 10. The pressure applied to the HCU 12 by the master cylinder 15 is monitored by a brake actuation pressure sensor 45 which is illustrated in FIG. 1 as being mounted in the first hydraulic brake line 19 between the master cylinder 15 and the first isolation valve 23. Alternately, the brake actuation pressure sensor 45 can be mounted in the second hydraulic brake line 20 between the master cylinder 15 and the second isolation valve 24 (not shown). The brake actuation pressure sensor 45 is rated to measure relatively low pressures which are on an order of magnitude of 60 bar (900 psi). A wheel brake pressure sensor 47 is included in each hydraulic line connecting each proportional control valve 26 to the associated wheel brake. The wheel brake pressure sensors 47 monitor the pressure being applied to the associated wheel brake and are rated to measure relatively high brake actuation pressures which are on an order of magnitude of 200 bar (3,000 psi). An accumulator pressure sensor 48 is connected to the high pressure accumulator 40 and monitors the output pressure of the accumulator 40. When the pump pressure exceeds the accumulator pressure or when the relief valve 39 is open, the accumulator pressure sensor 48 measures the pump output pressure. The accumulator pressure sensor 48 is also rated to measure relatively high pressures which are on an order of magnitude of 200 bar (3,000 psi).

The solenoid valves and pressure sensors are electrically connected to a microprocessor (not shown) which is included in an Electronic Control Module (ECU) (not shown). The ECU can either be mounted upon the HCU 12 or located remotely from the HCU 12. The ECU microprocessor is programmed with appropriate software to monitor the output signals from the pressure sensors 45, 47 and 48 and the brake pedal transducer 18. The microprocessor is responsive to the sensed pressures and displacement of the brake pedal transducer 18 to energize the pump 35 and to selectively actuate the proportional control valves 26 to supply pressurized hydraulic fluid for actuation of the wheel brakes 13 and 14.

The operation to the EHB 10 will now be described. During vehicle operation, the microprocessor associated with the HCU 12 continuously receives electrical signals from the brake pedal transducer 18 and the pressure sensors 45, 47 and 48. The microprocessor monitors the condition of the brake pedal transducer 18 and the pressure signals from the brake actuation pressure sensors 45 for potential brake applications. When the vehicle brake pedal 17 is depressed, the brake pedal displacement transducer 18 generates a displacement signal. Simultaneously, the brake actuation pressure sensor 45 generates a signal which is proportional to the force applied to the brake pedal 17. The microprocessor is operative to combine the displacement and force signals into a brake command signal. The microprocessor software is responsive to the brake command signal to actuate the pump motor and close the isolation valves 23 and 24 to separate the master cylinder 15 from the wheel brakes 13 and 14. The microprocessor then selectively operates the proportional control valves 26 in the HCU 12 unit to cyclically relieve and reapply hydraulic pressure to the wheel brakes 13 and 14. The hydraulic pressure applied to the wheel brakes is adjusted by the operation of the proportional control valves 26 to produce adequate brake torque to decelerate the vehicle in accordance with the brake command signal generated by the vehicle operator.

If the EHB 10 should fail, the isolation valves 23 and 24 return to their normally open positions to provide unassisted push though braking by allowing direct hydraulic communication between the master cylinder 15 and the front wheel brakes 13.

SUMMARY OF THE INVENTION

This invention relates to a structure for mounting a cluster of pressure sensors upon a control unit for an electro-hydraulic brake system.

As shown in FIG. 1, a typical electro-hydraulic brake system (EHB) 10 includes a plurality of pressure sensors 45, 47 and 48. In the past, vehicles have included pressure sensors for measuring engine manifold absolute pressure or barometric pressure, both of which have relatively low magnitudes. Vehicles also have been known to include transducers for monitoring fuel, oil and brake systems; however, such transducers typically have an accuracy which is inadequate for use in an EHB system. Additionally, past pressure sensors and transducers have usually been fabricated as discrete units which include a sensing element, signal conditioning electronics and an electrical connector enclosed in a single package. These discrete units are installed in the system being monitored and the signal conditioning electronics connected to the system microprocessor. As a result, the sensors and transducers used in the past have tended to be bulky and have had rather substantial space requirements. Typically, each sensor requires three electrical interfaces. Accordingly, an EBH system with six sensors requires 18 electrical interfaces. Thus, for an EHB, the space requirements for a plurality of conventional pressure sensors or transducers would be large. Accordingly, it would be desirable to provide more efficient packaging and mounting structures for multiple pressure sensors.

The present invention contemplates a hydraulic control valve which includes a control valve body having a plurality of internal passageways formed therein, the valve body further having a plurality of pressure sensing ports formed in a surface thereof which communicate with selected portions of the internal passageways. A housing is attached to the valve body, the housing having a plurality of bores formed therein. The housing bores communicate with the valve body pressure sensing ports. Furthermore, a plurality of pressure sensors are carried by the housing with each of the pressure sensors disposed in one of the housing bores and corresponding to one of the pressure sensing ports. Each of the pressure sensors is operative to sense the pressure of a fluid in the pressure port. A resilient material is disposed between the housing and the valve body, the resilient material forming a seal about each of the pressure ports.

The present invention further contemplates that a signal conditioning circuit is carried by the housing. In the preferred embodiment, the signal conditioning circuit is carried by a circuit substrate which is mounted directly upon the housing. Additionally, a layer of potting material is deposited upon the pressure sensing elements. It also is contemplated that the signal conditioning circuit sequentially samples the output signal generated by each of the pressure sensors and generates a multiplexed output signal which includes the pressure sensor output signals. In the preferred embodiment, the signal conditioning circuit includes a microprocessor which is operable to convert the multiplexed output signal into a serial digital data signal. Furthermore, the signal conditioning circuit can include at least one amplifier with the signal conditioning circuit operable to compensate the offset and gain of the amplifier and the pressure sensors. The signal conditioning circuit also can be electrically connected to a temperature sensor and be operable to condition the output signal for temperature.

The invention also contemplates that each pressure sensor includes a diaphragm having a surface which is exposed to the fluid in the pressure port. Each pressure sensor also includes an array of pressure sensitive transducers mounted upon the surface of the diaphragm opposite from the surface which is exposed to the fluid. In the preferred embodiment, the pressure sensitive transducers include an array of piezo-resistive transducers. The piezo-resistive transducers may be arranged in either a full bridge or a half bridge configuration.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 2:
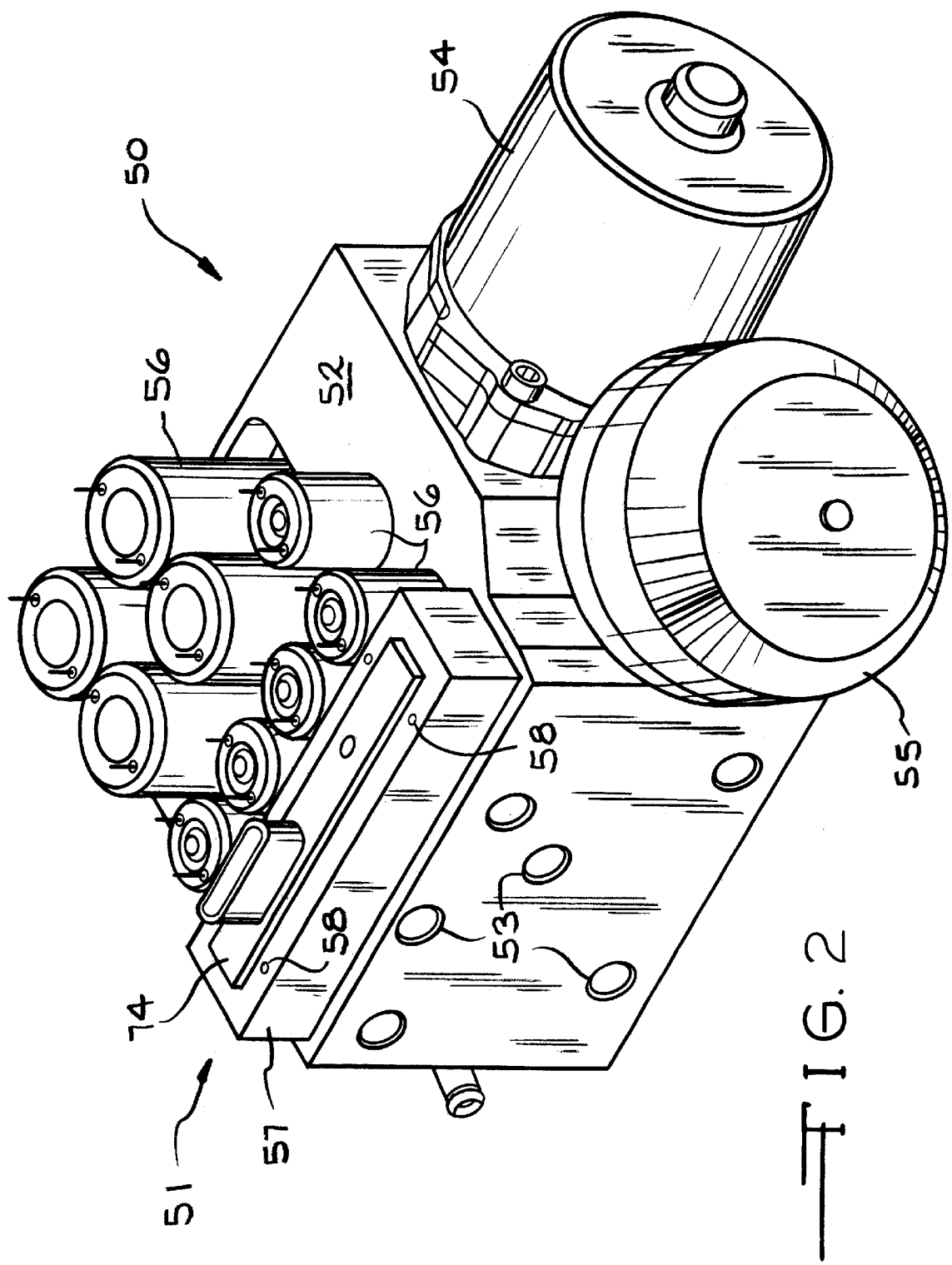
FIG. 2 is a perspective view of an EHB HCU which includes a pressure sensor cluster in accordance with the invention.

Referring again to the drawings, there is illustrated in FIG. 2, a HCU 50 which includes a pressure sensor cluster 51 which is in accordance with the present invention. As will be described below, the pressure sensor cluster 51 includes a plurality of pressure sensors and associated pressure signal conditioning circuitry. The pressure sensor cluster 51 is attached to the top surface of a HCU valve body 52. A plurality of ports 53 formed in the front of the HCU valve body 52 receive hydraulic lines (not shown) which communicate with the wheel brakes (not shown) and the master cylinder (not shown). A pump motor 54 and fluid accumulator 55 extend from the side of the HCU valve body 52. A plurality of solenoid coils 56 extend from the top of the of the HCU valve body 52.

The pressure sensor cluster 51 includes a pressure sensor cluster housing 57 which is secured to the HCU valve body 52 by a plurality of threaded fasteners 58. In the preferred embodiment, the housing 57 is cast from metal or machined from metal bar stock; however, the housing also can be formed from other materials, such as , for example, a ceramic or a plastic. As best seen in the sectional view shown in FIG. 3, the housing 57 has a plurality of bores 58 formed therethrough. In the preferred embodiment, six bores 58 are formed in the housing to correspond to the EHB 10 described above; however, the invention also may be practiced with more or less bores 58 formed in the housing 57. Each of the housing bores 58 receives a pressure sensor 59, which, in the preferred embodiment are formed from stainless steel. Each pressure sensors 59 includes a generally cylindrical housing 60 having a stepped axial bore 62 formed therein which extends axially from the bottom surface of the housing 60. As will be described in more detail below, the upper end of each bore 62 terminates in a thin diaphragm 64, upon which a pressure sensor array (not shown) is mounted. The lower end of the sensor housings are flared to form a flange 66 which extends in an outward radial direction from the housing 60. The flanges 66 cooperate with the pressure sensor cluster housing 57 to limit the distance the sensors 59 extend into the bores 58. In the preferred embodiment, the housing 57 is staked against the flanges 66 to secure the sensors 59 in the bores 58. However, other conventional methods also can be sued to secure the sensors 59 in the housing bores 58, such as, for example welding the flanges 66 to the housing 57.

A plurality of electrical conductors 68 extend from each sensor array and are connected to a Printed Circuit Board 70 (PCB) for the pressure sensor cluster. A signal conditioning circuit, which will be described below, is mounted upon the upper surface of the PCB 70. Electrical traces (not shown) deposited upon the upper surface of the PCB 70 connect the conductors 68 through the signal conditioning circuit and to a single electrical connector 72. Alternately, the electrical traces also can be deposited upon the lower surface of the PCB 70 (not shown) and covered with a layer of electrically insulative material. The connector 72 and PCB 70 are enclosed by a cover 74, as shown in FIG. 2. In the preferred embodiment, a gortex vent 74A is mounted in an aperture formed through the cover 74 to provide for atmospheric pressure balancing. The connector 72 is electrically connected to the EHB microprocessor and transmits the pressure signals generated by the pressure sensing arrays thereto. Alternately, if the EHB electronics are mounted upon the HCU valve body 52, the cover 74 can be omitted and the terminals 75 extending from the connector 72 electrically connected directly to the EHB circuit board.

Figure 3:
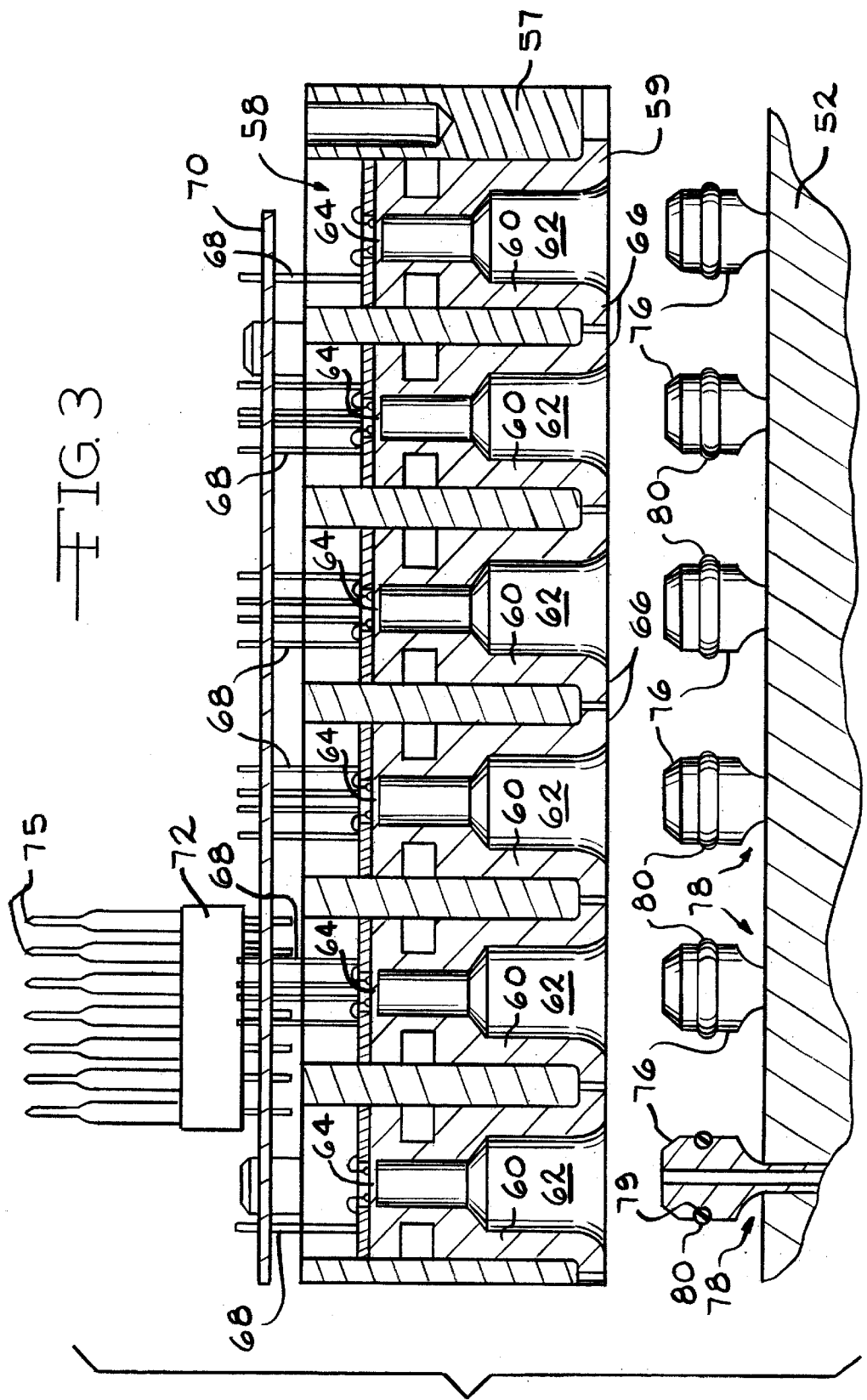
FIG. 3 is a sectional view of the pressure sensor cluster shown in FIG. 2

As shown in FIG. 3, in the preferred embodiment, each of the bores 62 formed in the pressure sensors 59 receives a corresponding transfer tube 76 which extends upwardly from the top surface of the HCU valve body 52. The transfer tubes 76 are hollow cylinders, as shown in the sectional view of the left tube 76 in FIG. 3, which communicate with corresponding pressure sensing ports 78 formed in the HCU valve body 52. The transfer tubes 76 serve to minimize the volume of air that could be trapped when bleeding the EHB system. The upper section of the bore can be shortened to further reduce the possibility of air entrapment. The transfer tubes 76 also provide a degree of compliance to compensate for variations in the sensor bore locations. The pressure sensing ports 78 communicate through valve body internal passageways with components of the EHB system. A circumferential groove 79 formed in the upper end of each of the transfer tubes 76 carries a resilient O-ring 80. The O-ring 80 co-operates with the surface of the corresponding pressure sensor bore 62 to form a seal therebetween to prevent the escape of hydraulic brake fluid.

Figure 1:
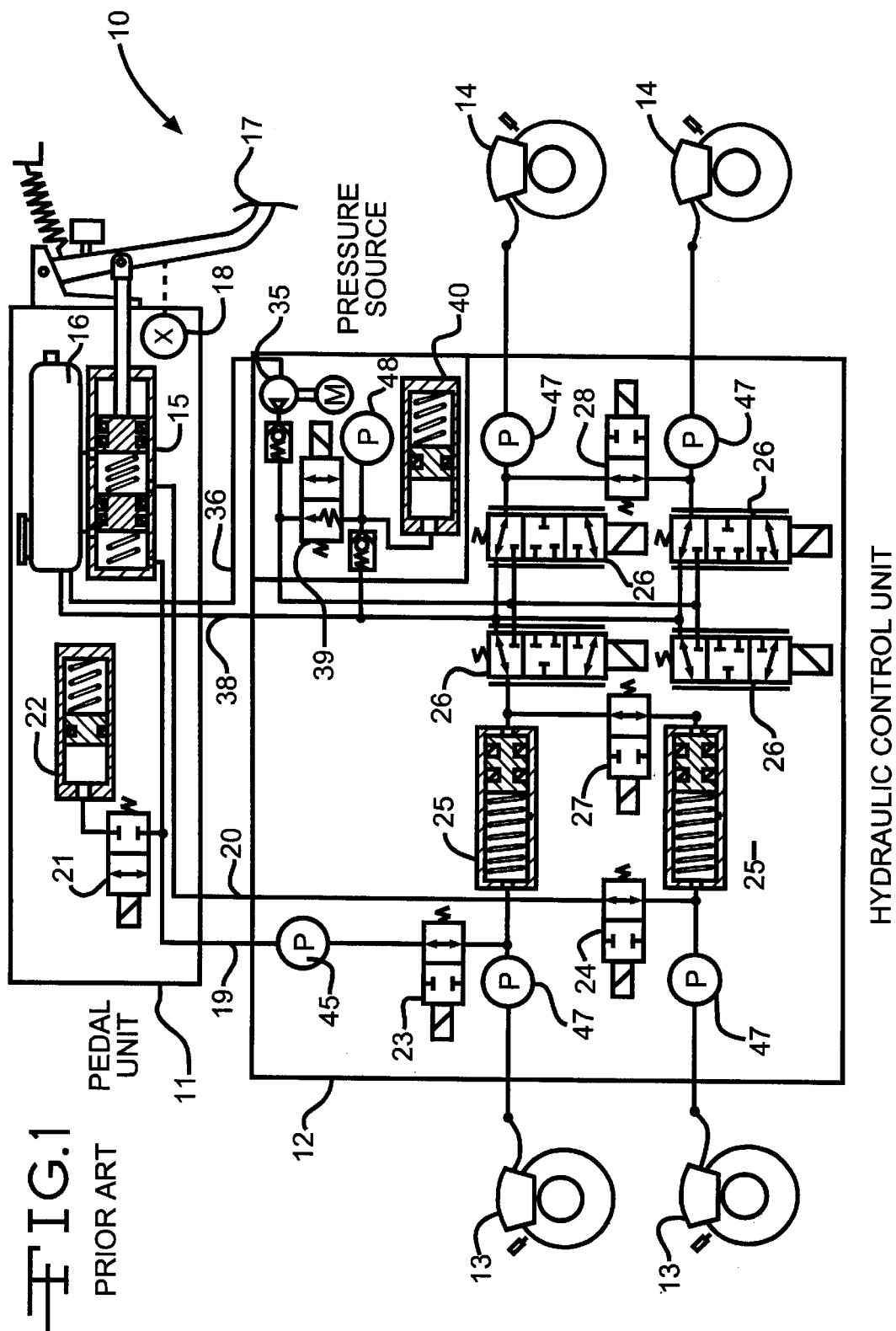
FIG. 1 is a schematic diagram of a typical electro-hydraulic brake system.

As indicated above, there are six pressure sensors 59 and transfer tubes 76, which correspond to the EHB 10 illustrated in FIG. 1. Accordingly, four pressure sensors monitor the pressure at each of the vehicle wheel brakes, one pressure sensor monitors the brake circuit actuation pressure and one pressure sensor monitors the accumulator pressure.

Figure 4:
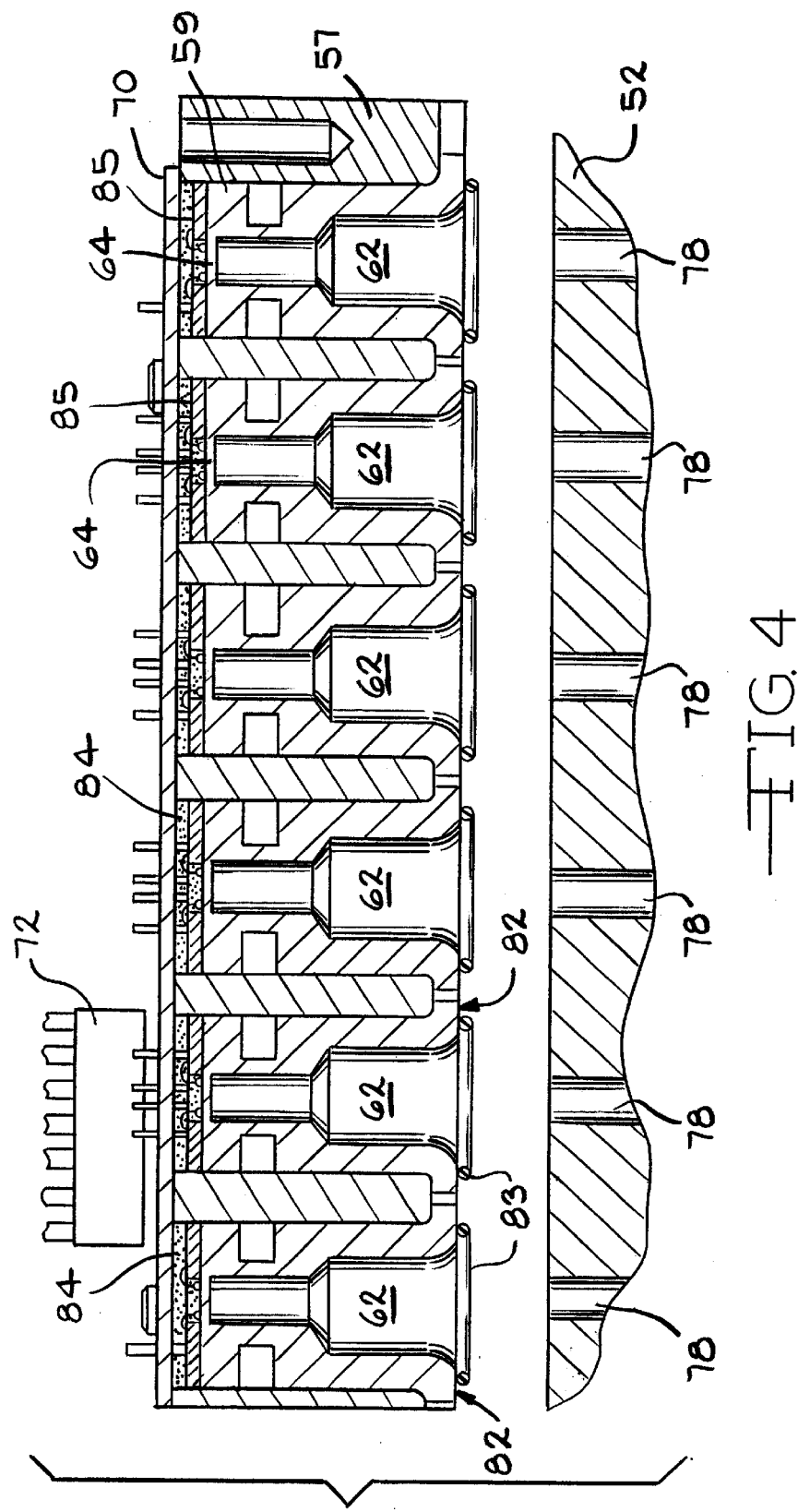
FIG. 4 is a sectional view of an alternate embodiment of the pressure sensor cluster shown in FIG. 3.

An alternate embodiment of the pressure sensor cluster structure is illustrated generally at 85 in FIG. 4. Components in FIG. 4 which are similar to components shown in FIG. 3 have the same numerical designators. As shown in FIG. 4, each of the pressure sensor bores 62 is aligned with a corresponding pressure sensing port 78 formed in the HCU valve body 52. It is contemplated that the lower end of each of the pressure sensors 59 has a circumferential groove 82 formed therein which carries an O-ring 83. The O-ring 83 forms a seal between the lower end of each of the pressure sensors 59 and the top surface of the valve body 52 to prevent the escape of hydraulic brake fluid. Additionally, a layer 84 of a potting material, such as, for example, a silicone gel, is disposed over the top surface of the individual pressure sensor elements. The layer of potting material 84 seals the pressure sensing arrays within recesses 85 formed between the pressure sensor diaphragms 64 and the PCB 70.

Figure 5:
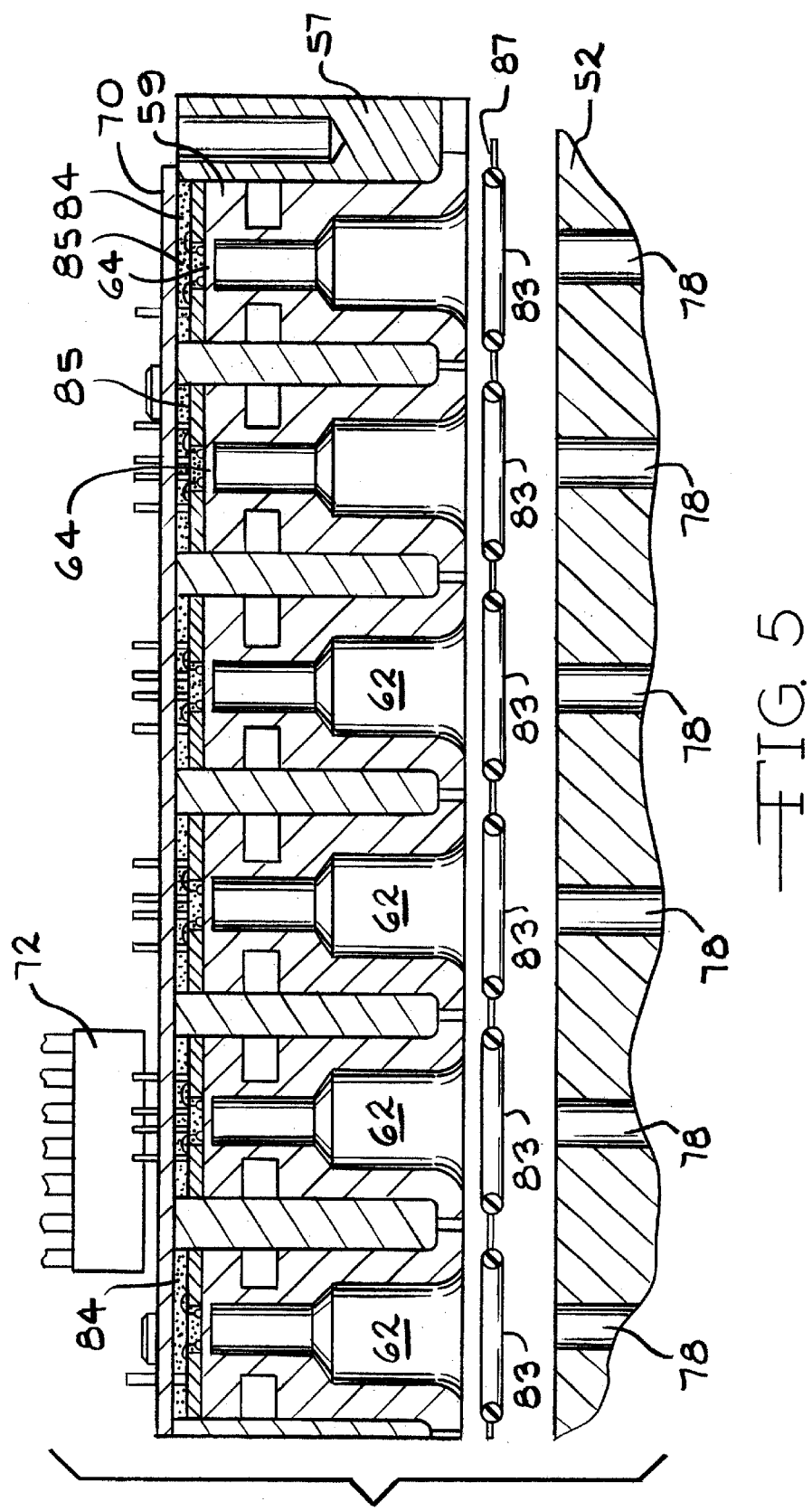
FIG. 5 is a sectional view of another alternate embodiment of the pressure sensor cluster shown in FIG. 3.

The O-rings 83 also can be formed integrally with a plastic locating sheet 87, as shown in FIG. 5. The plastic locating sheet 87 is disposed between the pressure sensor cluster housing 57 and HCU valve body 52 and positions the O-rings 83 relative to the pressure sensing ports 78 in the HCU valve body 52. In the preferred embodiment, apertures formed in the plastic sheet 87 (not shown) receive the threaded fasteners which secure the pressure sensor cluster housing 57 to the HCU valve body 52 to further assure proper alignment of the O-rings 83 with the pressure sensing ports 78 and the pressure sensor bores 62. The positioning of the O-rings 83 provides for higher yield assembly of the control valves 50 while also providing thermal insulation between the HCU valve body 57 and the pressure sensors 59. Alternately, a metal sheet (not shown) can be used in place of the plastic locating sheet 87.

Figure 6:
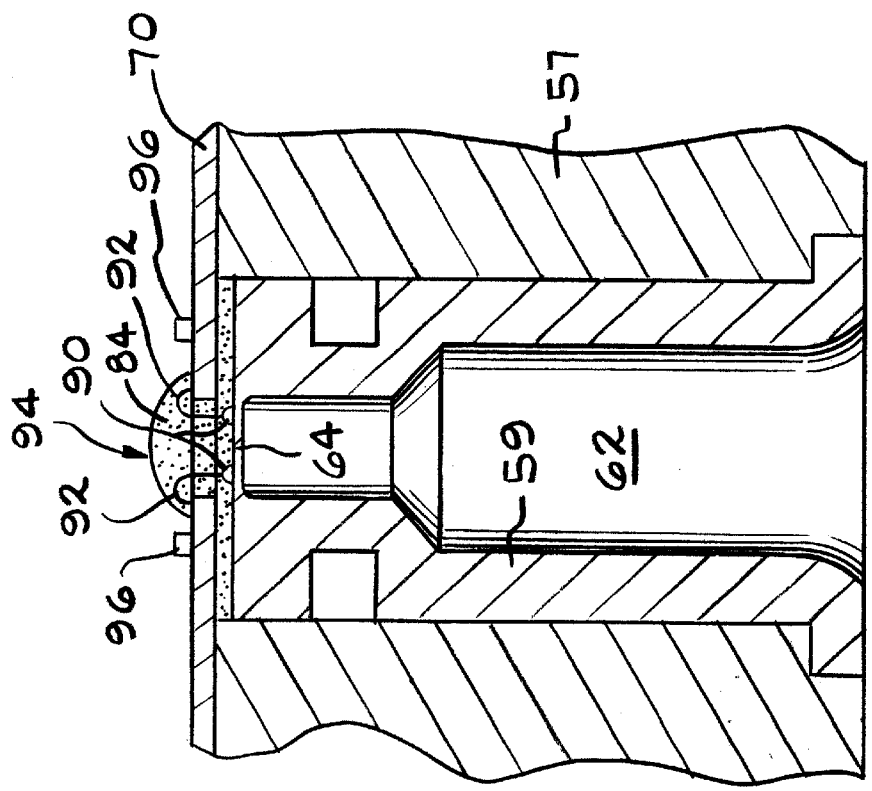
FIG. 6 is a sectional view of one of the pressure sensors shown in FIG. 5.

Details of the preferred structure of one of the pressure sensors 59 are illustrated in FIG. 6. The invention contemplates mounting a plurality of piezo-resistive transducers, or pressure sensing elements, 90 upon the top surface of the diaphragm 64 of each of the sensors 59. The transducers 90 can be arranged in an array forming a half or full bridge configuration. The transducers 90 can be created by having a silicone, or other conventional thin film material, such as, nichrome, sensing elements chemically deposed directly upon the top surface of the diaphragm 90. Alternately, the transducers 90 elements can be deposed upon a thin insulative film (not shown) which is attached to the top surface of the diaphragm 64. Upon deflection of the sensor diaphragm 64, the resistance of each transducer 90 changes in proportion to the amount of deflection while the piezo-resistive effect of the material amplifies the amount of change.

The transducers 90 are connected by wire bonds 92 to components of a signal conditioning circuit which is carried by the pressure sensor cluster PCB 70. As shown in FIG. 6, an aperture 94 is formed through the PCB 70 which correspond to the transducers 90. The PCB aperture 94 allows connection of the transducers 90 to the signal conditioning circuit. Trim resistors 96 for the transducers 90 also can be mounted upon the PCB 70. The trim resistors 96 can be used to partially compensate the offset and span characteristics of the sensor bridge, which may include temperature variations. Alternately, leads can extend from the transducers 90 through the small apertures formed in the PCB 70, as illustrated in FIGS. 3 through 5. The leads are soldered to the electrical traces on the upper surface of the PCB 70 by a conventional soldering method.

Figure 7:
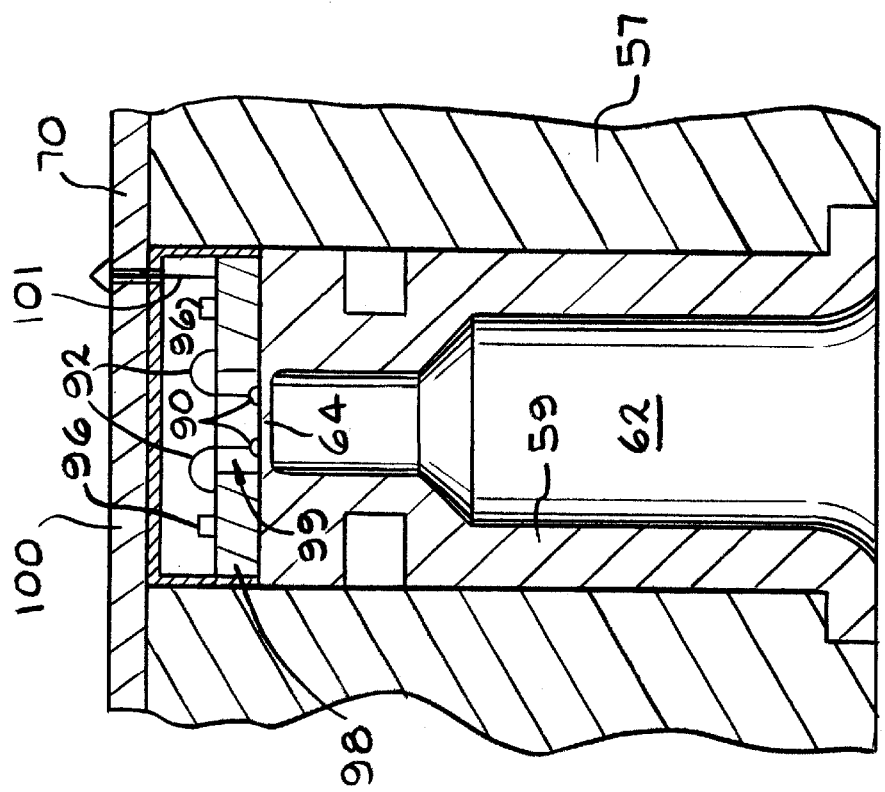
FIG. 7 is a sectional view of an alternate embodiment of the pressure sensor shown in FIG. 6.

An alternate structure for the pressure sensors is shown in FIG. 7 where components which are similar to components shown in prior figures have the same numerical designators. In FIG. 7, a disc shaped sensor PCB 98 is mounted upon the top surface of the pressure sensor 59. An aperture 99 is formed through the center of the sensor PCB 98 which exposes the sensor diaphragm 64. As described above, transducers 90 are mounted upon the top surface of the diaphragm 64. Trim resistors 92 may be mounted upon the sensor PCB 98 or on the PSC PCB 70. The trim resistors 92 are connected to the sensor transducers 90 by wire bonds 92. A cup shaped cap 100 covers the top of the pressure sensor 59 and thereby encloses the sensor PCB 98. Leads 101 extend through apertures formed through the cap 100 and pressure sensor cluster PCB 70 to electrically connect the transducers 96 to the signal conditioning circuit.

The operation of the pressure sensor 51 cluster will now be described. Hydraulic brake fluid flows through the pressure passageways formed in the HCU and into the associated pressure sensors 59. The brake fluid fills the bore 62 of the pressure sensor 59. As pressure of the brake fluid changes, the pressure change is applied uniformly to the interior surface of the pressure sensor bore 62, causing the thin diaphragm 64 formed across the upper end of the bore 62 to deflect. The deflection causes a change in the electrical characteristics of the bridge transducers 90 which are mounted upon the upper surface of the diaphragm 64. The changes in the transducer electrical characteristics are detected by the signal conditioning circuit and transmitted through the connector 72 to the EHB microprocessor where an algorithm controls the operation of the EHB. As will be described below, in the preferred embodiment, the pressure signals are time sampled and multiplexed into a single signal to allow the pressure data from all of the sensors 59 to be transmitted to the EHB microprocessor over one or more wires. Accordingly, the complexity of the wiring is greatly reduced with the structure of the invention. It is contemplated that the invention utilizes five electrical interconnections, which is a significant reduction from the 18 electrical interconnection utilized in the prior art EHB system described above.

Figure 8:
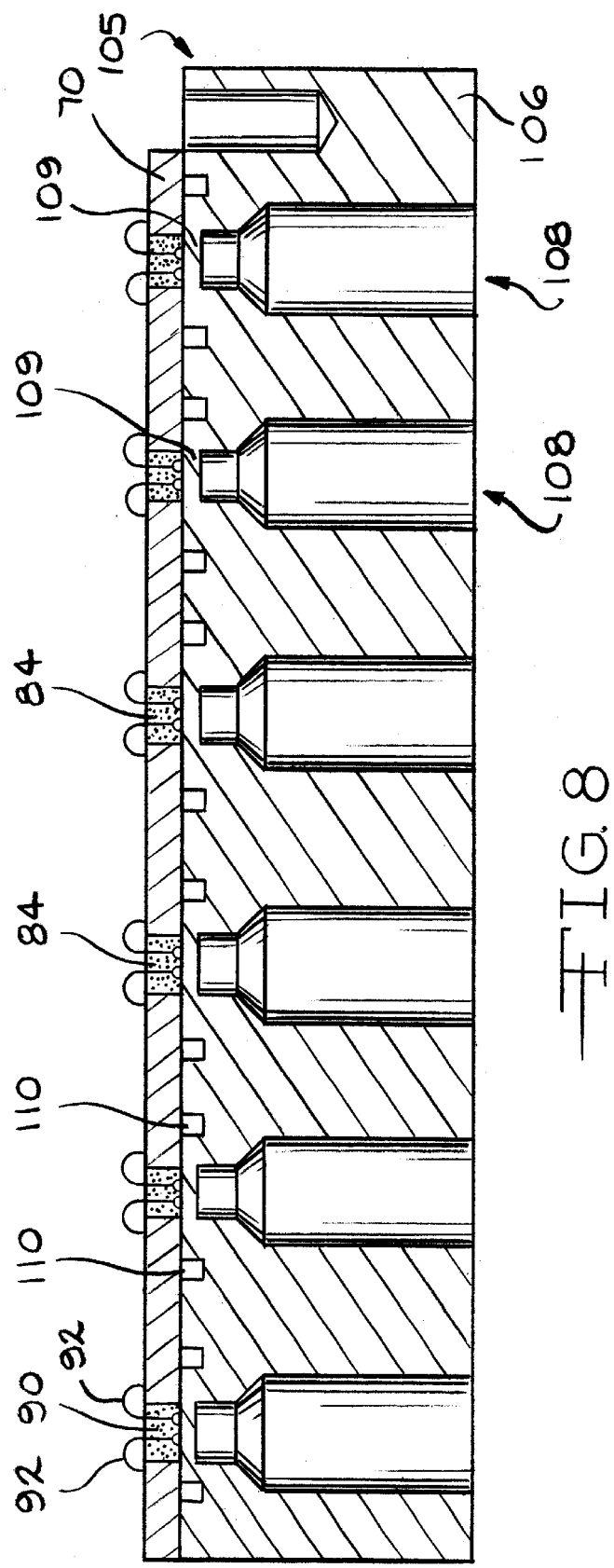
FIG. 8 is a sectional view of another alternate embodiment of the pressure sensor cluster shown in FIG. 3.

Another alternate embodiment of the pressure sensor cluster is illustrated generally at 105 in FIG. 8. As before, components shown in FIG. 8 which are similar to components shown in previous drawings have the same numerical designator. In FIG. 8, a stainless steel or other metal housing 106 is formed which integrally includes a plurality of pressure sensors. A plurality of stepped bores 108, which extend in an upward direction in FIG. 8, are formed in the housing 106. A diaphragm 109 is formed across the upper end of each of the bores 108. As described above, piezoresistive pressure sensing transducers 90 are mounted upon the upper surface of each of the diaphragms 109. The transducers 90 are arranged in a half or full bridge configuration and are electrically connected by wire bonds 92 to a signal conditioning circuit (not shown) which is carried upon the upper surface of the pressure sensor cluster PCB 70. The signal conditioning circuit can optionally include trim resistors (not shown).

A plurality of stress isolation grooves 110 are formed in the top surface of the housing 106. In the preferred embodiment, the grooves 110 extend transversely across the housing 106. Alternately, the grooves 110 can be circular and concentric with the pressure sensor diaphragms 109. The grooves 110 reduce strain in the diaphragms 109 by allowing the housing 106 to bend as it is attached to the HCU valve body 52.

As shown in the preceding FIGS. 3 through 7, the entire force of the hydraulic brake fluid pressure is applied to pressure sensors mounted in vertical bores formed through a housing. This can result in a great deal of force urging the sensors in an upward direction in the figures. Accordingly, the invention also contemplates alternate structures for mounting the pressure sensors within the housing. Two of these alternate structures are illustrated in FIGS. 9 and 10.

Figure 9:
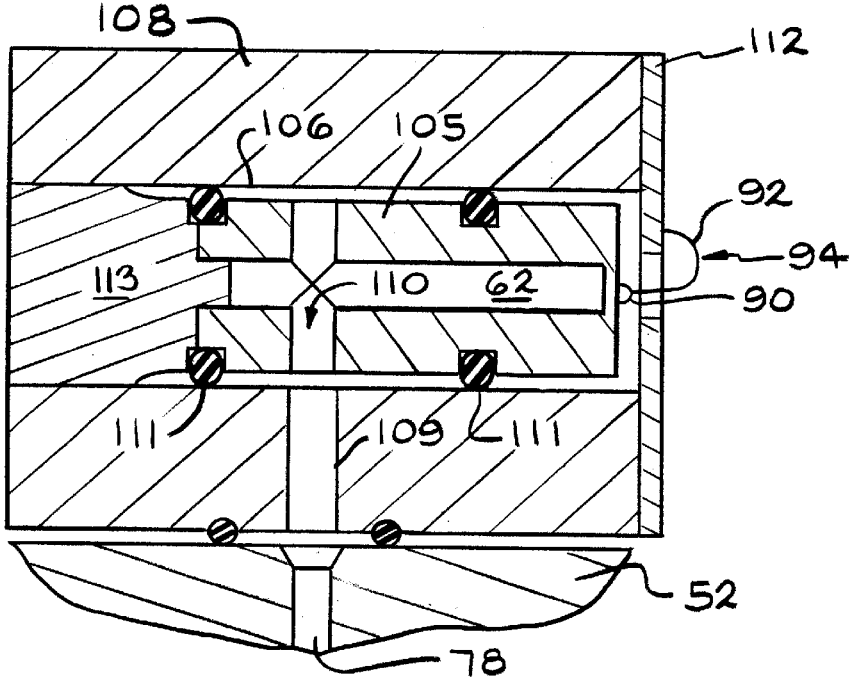
FIG. 9 is a sectional view of an alternate structure for a pressure sensor in the cluster shown in FIG. 3.

In FIG. 9, a transverse sectional view is shown of a pressure balanced pressure sensor 105 mounted in a stepped horizontal bore 106 formed through a pressure sensor cluster housing 108. A vertical bore 109 extending in a downward direction from the horizontal bore 106 communicates with a corresponding pressure sensing port 78 formed in the HCU valve body 52. A corresponding vertical bore 110 in the pressure sensor 105 provides communication between the housing bore 109 and the pressure sensor axial bore 62. The pressure sensor 105 carries a pair of O-rings 111 which form a seal between the pressure sensor 105 and the horizontal bore 106 to prevent the leakage of brake fluid. As shown in FIG. 9, a PCB 112 carrying the signal conditioning circuitry is mounted upon a side of the pressure sensor cluster housing 108. The pressure sensor 105 is retained in the horizontal bore 106 by a plug 113 which is secured in the end of the bore 106 by a conventional method, such as, for example, press fitting or staking. The fluid pressure is applied in both horizontal directions within the bore 62 of the pressure sensor 105 and the bore 106 of the housing 108. Thus, the resulting axial forces are balanced.

Figure 10:
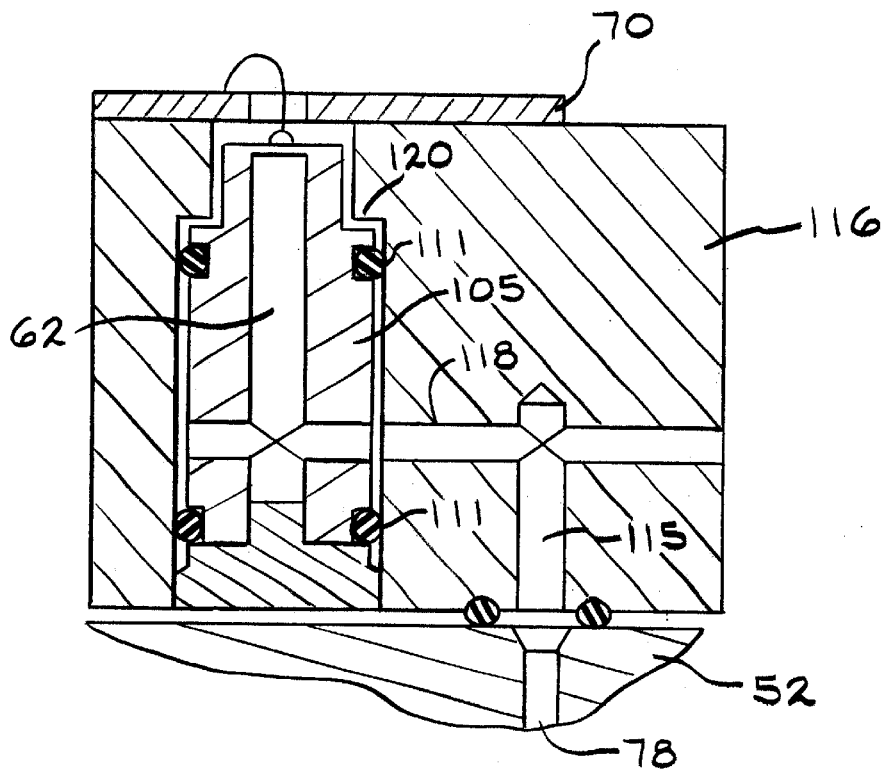
FIG. 10 is a sectional view of another alternate structure for a pressure sensor in the cluster shown in FIG. 3.

In FIG. 10, an offset inlet port 115 is illustrated. Components shown in FIG. 10 which are similar to components shown in FIG. 9 have the same numerical designators. The offset inlet port extends in a vertical direction into a pressure sensor cluster housing 116 and is aligned with a corresponding pressure sensing port 78 formed in the HCU valve body 52. An intersecting horizontal bore 118 provides communication between the offset inlet port 115 and a vertical stepped bore 120 formed in the housing 116. A pressure balanced pressure sensor 105 is disposed within the stepped bore 120. Accordingly, equal pressures are exerted on both ends of the sensor bore 62 and the stepped housing bore 120. Thus, the internal forces are balanced. Overall forces on the housing 116 are determined by the diameter of the port 115, which can be smaller than the ports in the embodiments described above.

Figure 11A:
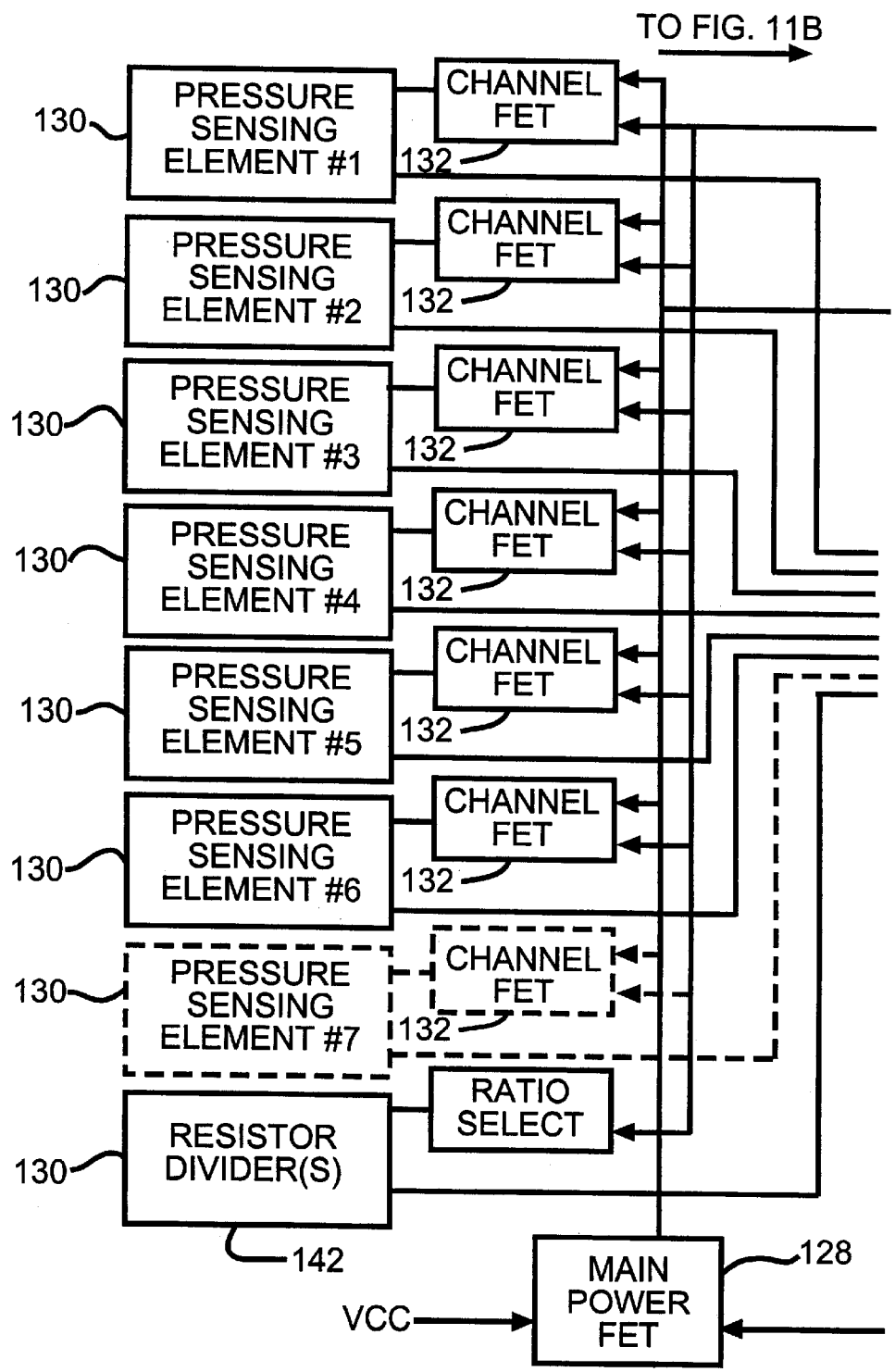
FIG. 11 is a block diagram for a signal conditioning circuit which is mounted upon the pressure sensor mounting structure shown in FIG. 4.
Figure 11B:
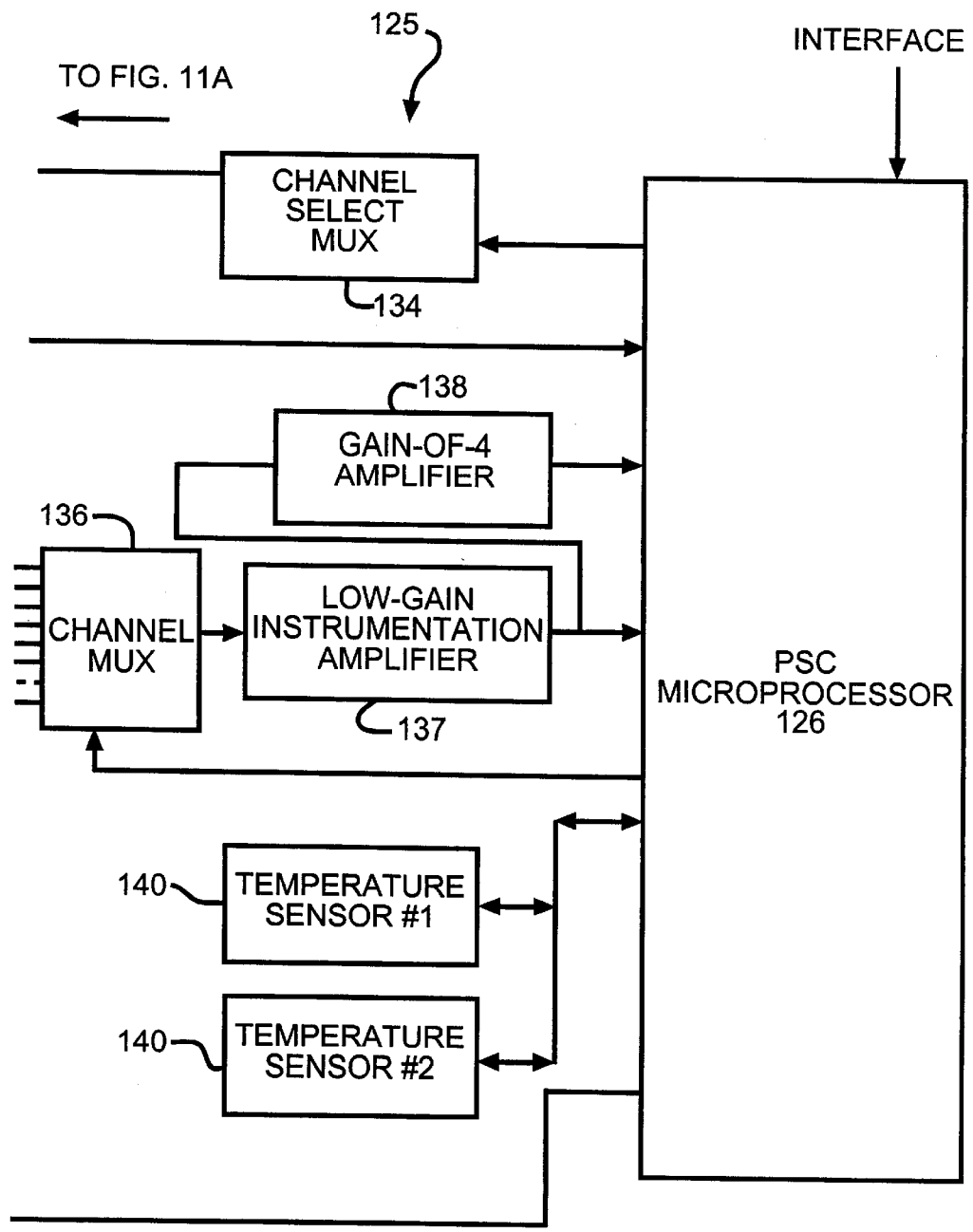

As described above, a signal conditioning circuit 125 is carried upon the PCB 70 mounted upon the pressure sensor cluster housing 57. A block diagram for the signal conditioning circuit 125 is shown in FIG. 11. The circuit 125 includes a Pressure Sensor Cluster (PSC) microprocessor 126 which is electrically connected through a bidirectional serial link 127 to the main control microprocessor in the EHB Electronic Control Unit (ECU) (not shown). Alternately, a parallel link (not shown) can connect the PSC microprocessor 126 to the EHB ECU. While the preferred embodiment is illustrated and described as utilizing a PSC microprocessor, it will be appreciated that the invention also may be practiced utilizing a microcontroller, a digital ASIC or a state machine in place of a microprocessor.

The PSC microprocessor 126 controls the application of power to the pressure sensor bridge circuits by causing electronic switches to change to their conducting states. In the preferred embodiment, the electronic switches are a main power FET 128 and channel FET's which are described below. The signal conditioning circuit 125 includes a plurality of pressure sensing elements 130. For the EHB system 10 illustrated in FIG. 1, there are six pressure sensing elements 130; however, the signal conditioning circuit 125 may include more or less pressure sensing elements 130. For example a seventh pressure sensing element 130 is outlined with a dashed line in FIG. 11. Each sensing element 130 includes a bridge circuit (not shown) which is mounted upon the upper surface of a corresponding pressure sensor diaphragm 64. Each bridge circuit is connected to the output of the main power FET 128 by an associated channel FET 132. The gates of the channel FET's 132 are connected to a channel selection multiplexer 134, The channel selection multiplexer 134 switches the channel FET's between their non-conducting and conducting states to energize the individual bridge circuits. The channel selection multiplexer 134 is connected to and controlled by the PSC microprocessor 126.

The outputs of the bridge circuits are supplied through a multiplexer 136 to a differential low gain instrumentation amplifier 137. The operation of the channel FET's 132 cooperates with the multiplexer 136 to cause the instrumentation amplifier 137 to generate a single multiplexed analog pressure signal which includes information generated by each of the pressure sensing elements 130.

The output of the instrumentation amplifier 137 is connected to a first input pin of the PSC microprocessor 126. The output of the instrumentation amplifier 137 also is connected to an input of a high resolution operation amplifier 138. The output of the high resolution operational amplifier 138 is connected to a second input pin of the PSC microprocessor 126. The purpose for the high resolution operational amplifier 138 will be explained below. The PSC microprocessor 126 converts the multiplexed analog pressure into a digital pressure signal. The digital pressure signal is transmitted over the bidirectional serial link 127 to the main control microprocessor in the EHB and, optionally, to other vehicle systems, such as the engine controller microprocessor.

The signal conditioning circuit 126 also includes a pair of temperature sensors 140 which are connected to the PSC microprocessor 126. The temperature sensors 140 provide temperature data to the PSC microprocessor 126. The PSC microprocessor transmits the temperature data over the bidirectional serial link 127 to the main control microprocessor in the EHB. The main control microprocessor uses the temperature data to compensate the pressure readings. Alternately, the pressure signal can be conditioned by the PSC microprocessor 126 before being transmitted to the main EHB microprocessor. Additionally, the signal conditioning circuit 125 includes one or more voltage dividers 142 comprising precision resistors. The voltage divider 142 is selectively connected to the input of the channel multiplexer 136 by the PSC microprocessor 126 to provide calibration voltages to the low gain amplifier 137.

Figure 12A:
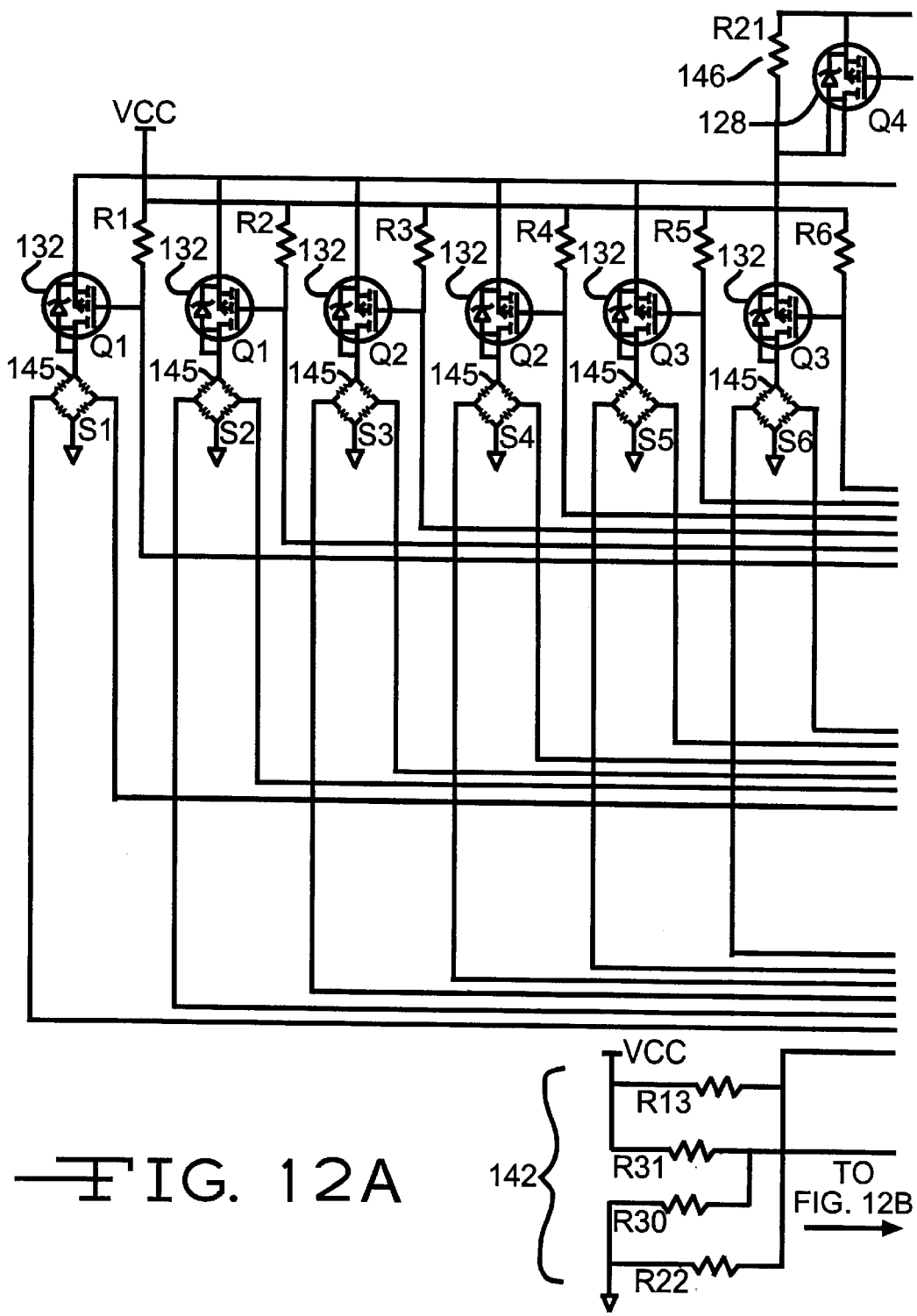
FIG. 12 is a schematic circuit diagram for the signal conditioning circuit shown in FIG. 11.
Figure 12B:
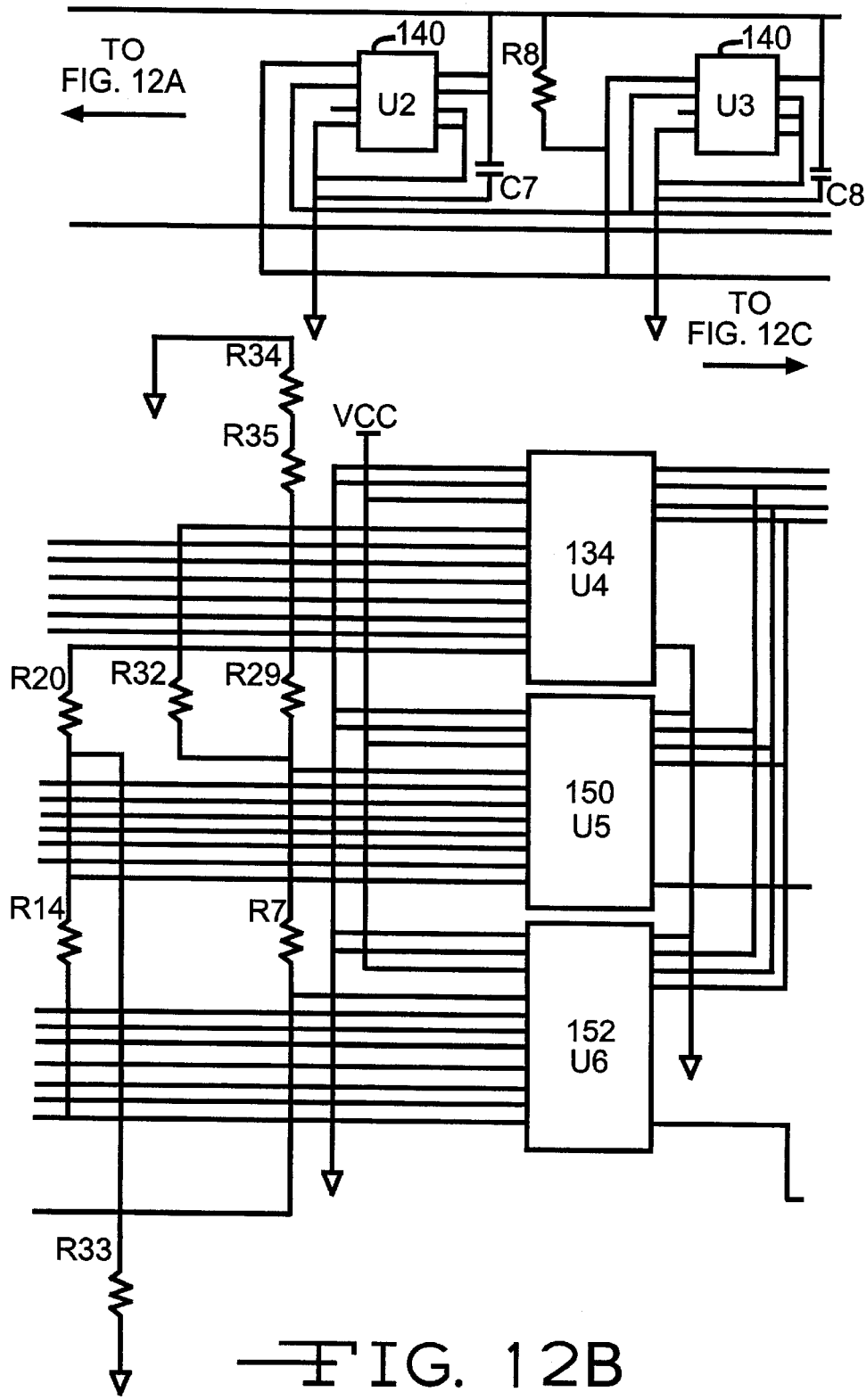
Figure 12C:
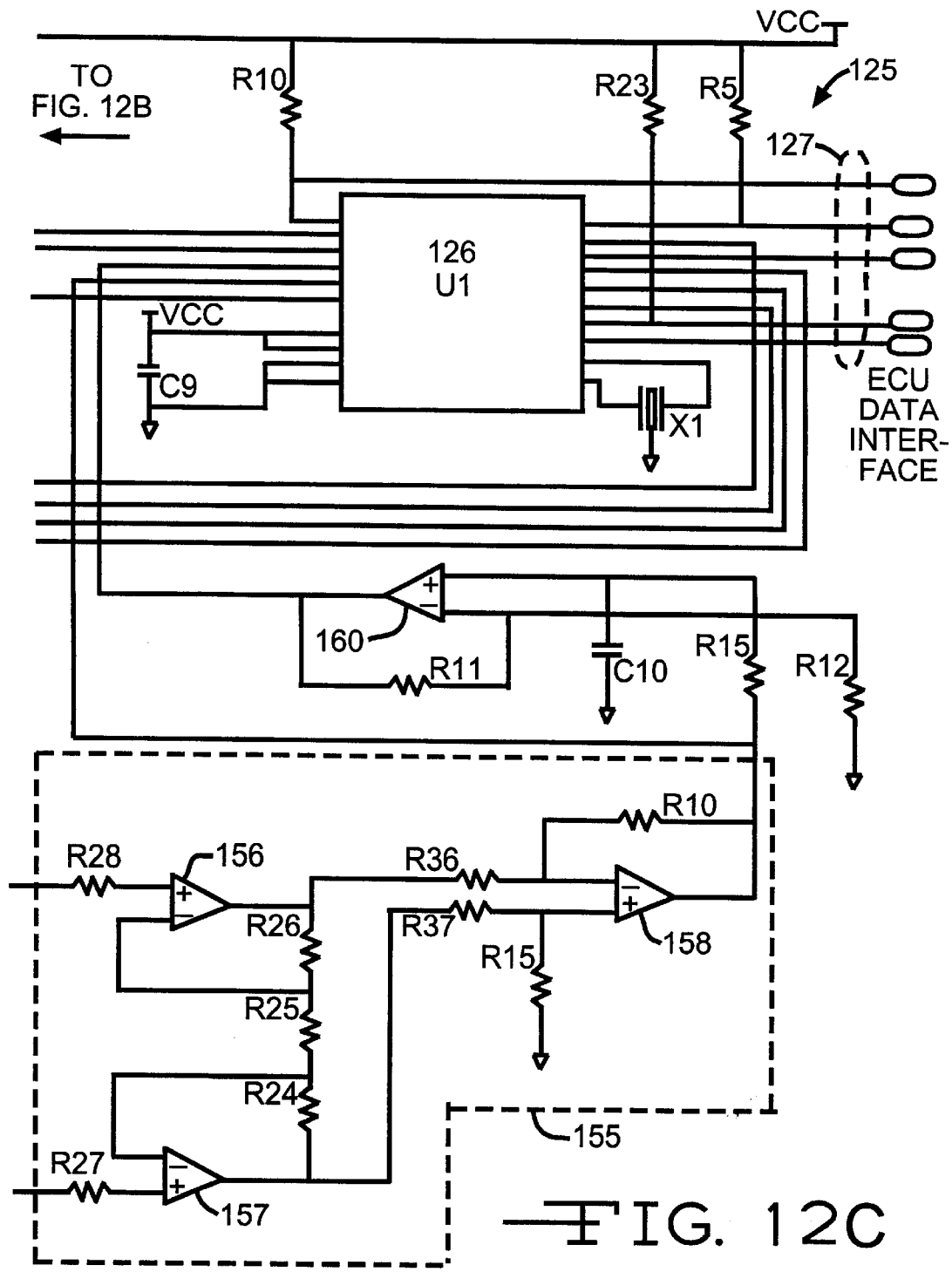

A schematic circuit diagram for the signal conditioning circuit 125 is shown in FIG. 12. The components shown in FIG. 12 which are similar to components shown in FIG. 11 have the same numerical designators. For clarity, FIG. 12 is shown on two sheets labeled 12A and 12B, with portions of the circuit 125 appearing on both sheets. As described above, the signal conditioning circuit 125 includes a microprocessor 126 which is electrically coupled by the bidirectional serial link 127 to the EHB microprocessor (not shown). The PSC microprocessor 126 receives pressure data signals from a plurality of bridge circuits 145, which are shown in the left portion of FIG. 12A. For the circuit shown, there are six transducer bridge circuits 145. In the preferred embodiment, full bridge circuits with a transducer in each bridge arm are used; however, the invention also can be practiced with half bridge circuits that contain transducers in two of the bridge arms and bridge completion resistors in the other two bridge arms.

The transducer bridge circuits 145 are connected by a bridge FET 132 to a power supply $V_{CC}$. The gates of the bridge FET's 132 are electrically connected to the channel selection multiplexer 134 which, in turn, is electrically connected to the PSC microprocessor 126. The channel selection multiplexer 134 switches the bridge FET's 132 between their conducting and non-conducting states by in response to timing signals generated by the PSC microprocessor 134. Accordingly, current flows through only one bridge circuit 145 at any given time. This reduces the total circuit current. In the preferred embodiment, the PSC microprocessor 126 monitors the voltage across a sensing resistor 146, which is connected between the power supply $V_{CC}$ and the bridge FET's 132. The current through the sensing resistor 146 is a function of the individual bridge currents and provides an indication of open or shorted bridge resistors. If the resulting voltage appearing across the sensing resistor 146 is outside of an acceptable voltage window, the PSC microprocessor 126 determines that the particular bridge circuit has an open or shorted arm and switches the corresponding bridge FET to its non-conducting state to prevent malfunctioning of the entire circuit 125 or portions thereof. The PSC microprocessor 126 also generates an appropriate error signal.

The main power FET 128 is connected across the sensing resistor 146. The main power FET 128 has a gate terminal which is connected to the strobe port of the PSC microprocessor 126. The PSC microprocessor 126 switches the main power FET 128 between its conducting and non-conducting states to control the use of the sensing resistor 146 and to supply power to the bridge circuits 145. When the main power FET 128 is non-conducting, the bridge current flows though the sensing resistor 146 and the PSC microprocessor 126 senses the voltage thereacross. The main power FET 128 is then switched to its conducting state to apply the full voltage across the associated bridge circuit 145 for the pressure sensing. Thus, the condition of each bridge circuit 145 is checked with the sensing resistor 146 before a pressure reading is taken.

The voltage from a first side of each bridge circuit 145 is supplied to a first analog output multiplexer 150 while the voltage from a second side of each bridge circuit 145 is supplied to a second analog output multiplexer 152. For simplicity in the block diagram shown in FIG. 11, the first and second output multiplexers 150 and 152 were combined as the single channel multiplexer 136. The resulting multiplexed analog output signals from the output multiplexers 150 and 152 are applied to the input terminals of a conventional instrumentation amplifier circuit 155. The amplifier circuit 155 includes first and second operational amplifiers 156 and 157 which have a high input impedance to assure that the bridge circuits 145 are not loaded down by the rest of the signal conditioning circuit. The outputs of the operational amplifiers 156 and 157 are electrically connected to the input terminals of a differential amplifier 158. The differential amplifier 158 generates a voltage which functions as an output analog pressure signal. The pressure signal is fed directly to a first input pin on the PSC microprocessor 126.

The differential amplifier output signal is also fed through a high resolution operational amplifier 160 to a second input pin on the PSC microprocessor 126. The PSC microprocessor 126 is usually responsive to the signal supplied from the high resolution operational amplifier 160. However, if the PSC microprocessor 126 determines that the high resolution operational amplifier 160 is saturated, the PSC microprocessor 126 uses the direct output from the differential amplifier 158. Accordingly, the high resolution operational amplifier 160 increases the resolution of the signal conditioning circuit by amplifying small magnitude pressure signals while the differential amplifier 158 provides amplification for large magnitude pressure signals. In the preferred embodiment, the gain of the high resolution operational amplifier 160 is four; however, other values for the gain also can be used. The PSC microprocessor 126 internally multiplies the direct output from the differential amplifier 158 by the same gain as used by the high resolution operational amplifier 160 so that both output signals are scaled the same. Thus, the output signal resolution is greater than that of the analog to digital converter of the microprocessor. However, the multiplied signal from the differential amplifier 158 has less resolution than the output signal from the high resolution amplifier 160.

The PSC microprocessor 126 converts the multiplexed pressure readings into a ten bit word and generates a serial data stream which is supplied to the main EHB microprocessor (not shown) over the serial data link 127. While the invention is being described as utilizing ten bit words, it will be appreciated that the invention also can be practiced using words having more or less bits. The data link 127 is bidirectional with clock, sync and data signals coupling the signal conditioning circuit 125 to the main EHB microprocessor.

As described above, the signal conditioning circuit 125 also includes a pair of temperature sensors 140 which monitor the temperature of the pressure transducer block and generate temperature signals. As also described above, in the preferred embodiment, the PSC microprocessor 126 receives the temperature signals and sends them to the EHB microprocessor. The EHB microprocessor compensates the pressure signals for potential transducer temperature errors, which reduces the cost of the PCS. Alternately, the pressure signals can be temperature compensated within the PSC microprocessor 126. When the signal conditioning circuit 125 is assembled, the pressure sensing elements and the circuit 125 are temperature and pressure calibrated by subjecting the sensing elements and the circuit to a range of expected temperatures and/or pressures. The resulting calibration data is stored in the ROM of the PSC microprocessor 126 for use by either the EHB microprocessor or the PSC microprocessor 126 for temperature compensation. This results in better accuracy since each PSC 51 is able to communicate its temperature and pressure characteristics to the EHB ECU, unlike traditional discrete sensors.

Alternately, the temperature can be determined from changes in total bridge resistance in lieu of utilizing dedicated temperature sensors. Accordingly, the temperature sensors can be eliminated from the PSC circuit 125 to further reduce costs. If this alternate approach is used, the pressure sensing elements and the circuit 125 are calibrated at the same time during manufacture of the PSC 51. The calibration data is stored in the PSC microprocessor ROM.

The PSC microprocessor 126 also is operative, to apply a test voltage through the output mutliplexers 150 and 152 to the amplifiers 155 and 160 to determine the offset and gain thereof. In the preferred embodiment, the tests include grounding the amplifier input to measure the amplifier offset and applying predetermined calibration voltages to the amplifier input to measure the amplifier gain. The predetermined calibration voltages are generated by the voltage divider 142 and other resistors. The calibration voltages are selected to be less than the saturation voltage of the high resolution amplifier 160 to assure that the full range of the amplifier 160 is calibrated. In the preferred embodiment, the amplifier offset and gain are stored in the ROM of the PSC microprocessor 126 when the signal conditioning circuit 125 is assembled and transmitted to the EHB microprocessor to further compensate the pressure signals. Alternately, offset and gain compensation can be provided directly by the PSC microprocessor 126. Those test voltages can also be used to confirm that the multiplexers and the rest of the signal conditioning path are operating properly.

Figure 13:
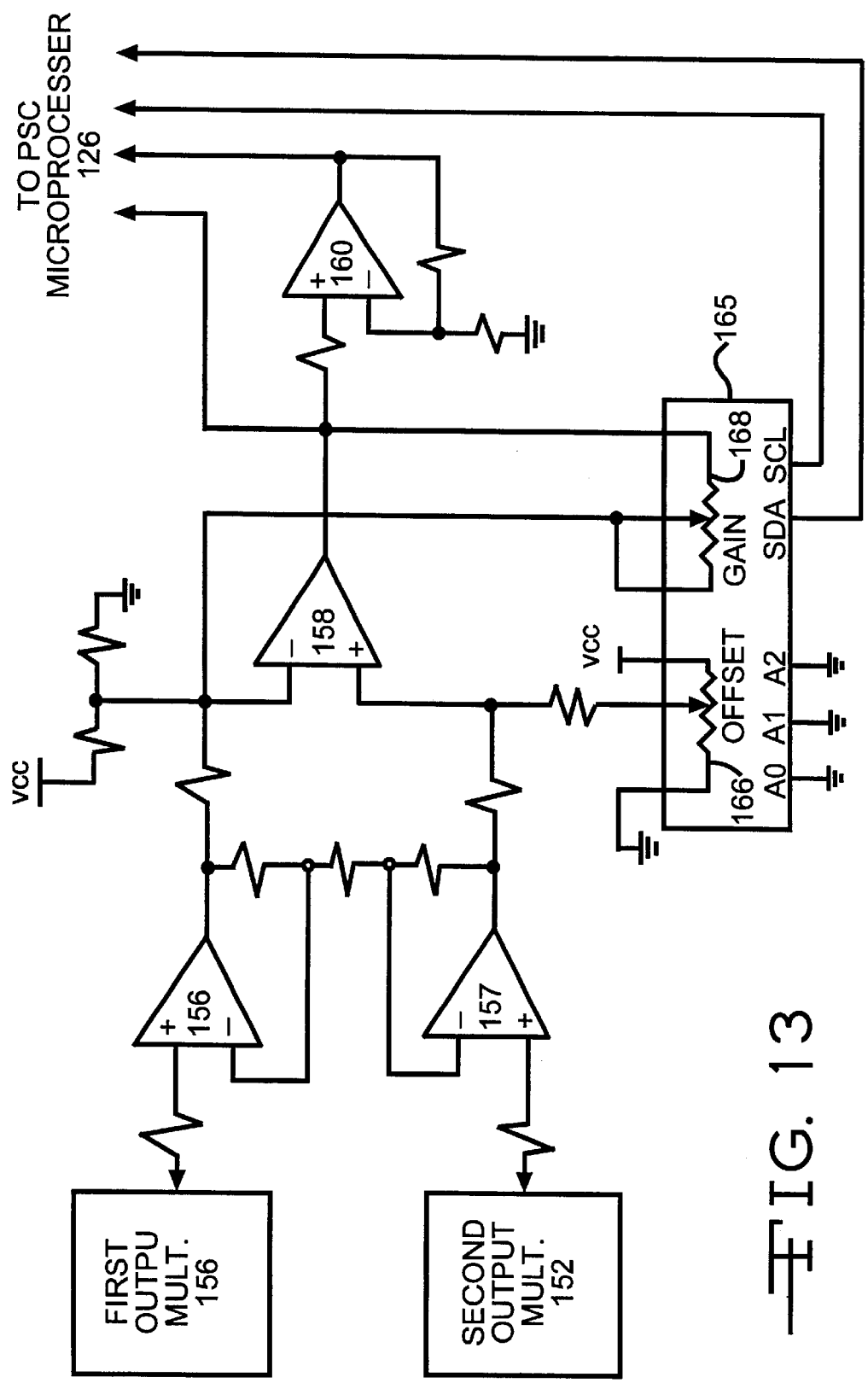
FIG. 13 is a schematic circuit diagram for an alternate embodiment of the compensation circuit used in FIG. 12.

The present invention also contemplates adjusting the amplifier gain and/or offset with a digital compensation scheme to compensate for variations in sense element offset, span and/or linearity characteristics at one or more temperatures. While the following describes adjusting gain, offset and linearity, it will be appreciated that the invention also can be practiced to adjust only one or two of these parameters. These compensation schemes use digitally adjustable elements through, for example, serial, parallel or incremental interfaces to change the gain and/or offset, and thereby the linearity, of the signal conditioning path. Such elements can include digital potentiometers, DAC's and the such. For the preferred embodiment, the amplifier offset and gain are adjusted with a digital potentiometer. The use of a digital potentiometer 165 in the signal conditioning circuit 125 is illustrated in FIG. 13 where only a portion of the signal conditioning circuit 125 shown in FIG. 12 is included. In the preferred embodiment, the digital potentiometer 165 includes a pair of fixed resistors and associated wiper contacts with 32 tap points that are digitally controlled by the PSC microprocessor 126, as shown in FIG. 13. Thus, the digital potentiometer 165 includes a first potentiometer 166 connected to the positive input terminal of the differential amplifier 158. The first potentiometer 166 functions as an offset input resistor. The digital potentiometer 165 also includes a second potentiometer 168 connected between the output terminal and the negative input terminal of the differential amplifier 158. Thus, the second potentiometer 168 functions as a feedback resistor and controls the gain of the differential amplifier 158. It is contemplated that the PSC microprocessor 126 reads data from a lookup table stored in its ROM to position the potentiometers 166 and 168. The lookup table values are selected for each of the bridge circuits 145 and stored during calibration of the signal conditioning circuit 125. The compensation values are then changed by the PSC microprocessor 126 to match the individual sensor bridge circuits 145. When a particular sensor 59 is selected for sampling, the needed compensation for the associated bridge circuit 145 is obtained from the lookup table and signals are sent to the digital potentiometer 165 to adjust the offset and gain potentiometers 166 and 168 accordingly. Thus, each of the pressure sensor bridge circuits 145 can be compensated by one circuit in lieu of providing passive compensation circuits for each sensor bridge circuit 145.

The signal conditioning circuit 125 provides a number of advantages over the prior art. The circuit 125 replaces six discrete ASIC's, which would be used in prior art, with shared electronic components which multiplex, amplify and convert the individual pressure signals. Accordingly, the shared electronic components can be integrated into a single ASIC to reduce part count and costs. The PSC or EHB microprocessor can linearize and compensate data in the digital domain to improve accuracy. Furthermore, the PSC or EHB microprocessor can provide additional advanced diagnostics. The overall reliability of the data gathering circuitry and data integrity is improved while serial communication is provided between the pressure sensors and the EHB microprocessor.

While the preferred embodiment of the invention has been described and illustrated with a structure having a linear array of pressure sensors, it will be appreciated that the invention also can be practiced with the sensors mounted in parallel arrays (not shown). For example, eight sensors could be mounted within a PSC housing in two parallel arrays having four sensors in each array. The sensors would be connected to a signal conditioning circuit which would also be mounted upon the PSC housing, as described above.

Additionally, while the preferred embodiment of each of the sensor array structures has been illustrated with a silicone or thin film pressure sensor, it will be appreciated that other conventional pressure sensors also can be used with a specific structure. Thus, it is contemplated that pressure sensors formed from ceramics or micro-machined silicone also can be used with the above described mounting structures and signal conditioning circuit.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A hydraulic control valve comprising:
   a control valve body having a plurality of passageways formed therein, said valve body further having a plurality of pressure sensing ports formed in a surface of said valve body, said pressure sensing ports communicating with selected portions of said passageways;
   a housing attached to said valve body, said housing having a plurality of bores formed therein, each of said bores in direct continuous communication with a corresponding one of said valve body pressure sensing ports; and
   a plurality of pressure sensors carried by said housing; each of said pressure sensors disposed in one of said housing bores and corresponding to one of said pressure sensing ports, each of said pressure sensors operative to sense the pressure of a fluid in said pressure port.

2. A hydraulic control valve according to claim 1 further including a resilient material disposed between said housing and said valve body, said resilient material forming a seal about each of said pressure ports.

3. A hydraulic control valve according to claim 2 further including a signal conditioning circuit carried by said housing.

4. A hydraulic control valve according to claim 3 wherein said signal conditioning circuit is carried by a circuit substrate, said circuit substrate being mounted directly upon said housing.

5. A hydraulic control valve according to claim 4 wherein the hydraulic control valve is included in an electro-hydraulic brake system.

6. A hydraulic control valve according to claim 1 further including at least one hollow transfer tube carried by one of said pressure sensing ports and extending from said valve body, said transfer tube extending into a corresponding housing bore and providing fluid communication between said pressure port and said housing bore.

7. A hydraulic control valve according to claim 6 further including a signal conditioning circuit carried by said housing.

8. A hydraulic control valve according to claim 7 wherein said signal conditioning circuit is carried by a circuit substrate, said circuit substrate being mounted directly upon said housing.

9. A hydraulic control valve according to claim 1 further including a signal conditioning circuit carried by said housing.

10. A hydraulic control valve according to claim 9 wherein said signal conditioning circuit is carried by a circuit substrate, said circuit substrate being mounted directly upon said housing.

11. A hydraulic control valve according to claim 9 wherein said signal conditioning circuit samples each of said pressure sensors and generates an analog multiplexed output signal which includes said pressure sensor samples.

12. A hydraulic control valve according to claim 11 wherein said signal conditioning circuit includes a microprocessor, said microprocessor being operable to convert said analog multiplexed output signal into a serial digital data signal.

13. A hydraulic control valve according to claim 12 wherein said signal conditioning circuit includes first and second amplifiers connected between said pressure sensors and said microprocessor, said amplifiers operable to increase the low end resolution of the pressure sensor output data.

14. A hydraulic control valve according to claim 1 wherein said pressure sensors are balanced pressure sensors.

15. A hydraulic control valve according to claim 1 wherein said housing has a plurality of bores formed therein, each of said bores corresponding to said pressure sensing ports formed in said valve body and further wherein said pressure sensors include diaphragms formed across an end of each of said bores, each of said diaphragms carrying a pressure sensing device.

16. A hydraulic control valve according to claim 15 wherein said pressure sensing device includes an array of pressure sensitive transducers mounted upon the surface of the diaphragm opposite from said surface which is exposed to said fluid.

17. A hydraulic control valve according to claim 1 wherein said bores formed in said housing are perpendicular to said control valve body.

18. A hydraulic control valve according to claim 1 wherein said bores formed in said housing are parallel to said control valve body and further wherein said housing includes a plurality of passageways which extend into said housing perpendicular to said control valve body, said passageways providing communication between said pressure ports and in said control valve body and said bores in said housing, whereby said pressure sensors disposed within said bores are balanced.

19. A hydraulic control valve according to claim 1 wherein said pressure sensors include an array of pressure sensitive transducers.

20. A hydraulic control valve according to claim 19 wherein said pressure sensitive transducers are electrically connected to said signal conditioning circuit by wire bonds.

21. A hydraulic control valve according to claim 19 wherein said pressure sensor includes a diaphragm having a surface which is exposed to said fluid in said pressure port, and further wherein said pressure sensitive transducers are mounted upon the surface of the diaphragm opposite from said surface which is exposed to said fluid.

22. A hydraulic control valve according to claim 21 wherein said pressure sensitive transducers are electrically connected to a passive compensation circuit which includes a plurality of resistors.

23. A hydraulic control valve comprising:
a control valve body having a plurality of passageways formed therein, said valve body further having a plurality of pressure sensing ports formed in a surface of said valve body, said pressure sensing ports communicating with selected portions of said passageways;
a housing attached to said valve body, said housing having a plurality of bores formed therein, said bores communicating with said valve body pressure sensing ports;
a plurality of pressure sensors carried by said housing; each of said pressure sensors disposed in one of said housing bores and corresponding to one of said pressure sensing ports, each of said pressure sensors operative to sense the pressure of a fluid in said pressure port;
a signal conditioning circuit carried by said housing, said signal conditioning circuit being operable to sample each of said pressure sensors and generate an analog multiplexed signal which includes said pressure sensor signals; and
a microprocessor included in said signal conditioning circuit, said microprocessor being operable to convert said analog multiplexed signal into a serial digital signal, said microprocessor being further operable to compensate said multiplexed output signal.

24. A hydraulic control valve according to claim 23 wherein said signal conditioning circuit includes a source of a predetermined voltage, said signal conditioning circuit being operable to sample said source of predetermined voltage to calibrate elected components of said signal conditioning circuit.

25. A hydraulic control valve according to claim 23 wherein said signal conditioning circuit also is operable to compensate said pressure sensors.

26. A hydraulic control valve according to claim 25 wherein values for compensating said pressure sensors are stored in a memory which is included in said signal conditioning circuit microprocessor.

27. A hydraulic control valve according to claim 23 further including a temperature sensor which is electrically connected to said signal conditioning circuit and further wherein said signal conditioning circuit is operable to compensate said output signal for temperature.

28. A hydraulic control valve according to claim 23 wherein said pressure sensor include resistive bridge circuits and said signal conditioning circuit is operable to determine the temperature from said bridge circuits and further wherein said signal conditioning circuit is operable to compensate said output signal for temperature.

29. A hydraulic control valve according to claim 23 wherein said signal conditioning circuit includes at least one amplifier and further wherein said signal conditioning circuit is operable to compensate the offset and gain of said amplifier.

30. A hydraulic control valve according to claim 29 wherein values for compensating said offset and gain of said amplifier are stored in a memory which is included in said signal conditioning circuit microprocessor.

31. A hydraulic control valve according to claim 30 wherein said signal conditioning circuit includes an electronic circuit which coupled to said amplifier and microprocessor; said electronic circuit being adjusted by said microprocessor to adjust one of said offset and gain to correspond to a particular pressure sensor which is being sampled.

32. A hydraulic control valve according to claim 31 wherein said electronic control circuit includes a digital potentiometer.

33. A hydraulic control valve comprising:
a control valve body having a plurality of passageways formed therein, said valve body further having a plurality of pressure sensing ports formed in a surface of said valve body, said pressure sensing ports communicating with selected portions of said passageways;
a housing attached to said valve body, said housing having a plurality of bores formed therein, said bores communicating with said valve body pressure sensing ports; and
a plurality of pressure sensors carried by said housing; each of said pressure sensors disposed in one of said housing bores and corresponding to one of said pressure sensing ports, each of said pressure sensors including a diaphragm having a surface that is exposed to said fluid in said pressure port;
an array of pressure sensitive transducers mounted upon a surface of said diaphragm that is opposite from said surface that is exposed to said fluid, said array of pressure sensitive transducers operative to sense the pressure of a fluid in said pressure port; and
a microprocessor carried by said housing, said microprocessor being operable to monitor said transducer array to determine that said array is functioning properly.

34. A hydraulic control valve comprising:
a control valve body having a plurality of passageways formed therein, said valve body further having a plurality of pressure sensing ports formed in a surface of said valve body, said pressure sensing ports communicating with selected portions of said passageways;
a housing attached to said valve body, said housing having a plurality of bores formed therein, said bores communicating with said valve body pressure sensing ports; and
a plurality of pressure sensors carried by said housing; each of said pressure sensors disposed in one of said housing bores and corresponding to one of said pressure sensing ports, each of said pressure sensors including a diaphragm having a surface that is exposed to said fluid in said pressure port;
an array of pressure sensitive transducers mounted upon a surface of said diaphragm that is opposite from said surface that is exposed to said fluid, said array of pressure sensitive transducers operative to sense the pressure of a fluid in said pressure port; and
a layer of potting material disposed over said pressure sensor transducers.

35. A hydraulic control valve according to claim 34 wherein said layer of potting material includes a silicone gel.

36. A hydraulic control valve according to claim 35 wherein said array of pressure sensitive transducers includes piezo-resistive transducers.

37. A hydraulic control valve according to claim 36 wherein said piezo-resistive transducers are included in a full bridge configuration.

38. A hydraulic control valve according to claim 36 wherein said piezo-resistive transducers are included in a half bridge configuration.

39. A sensing device for a vehicle comprising:

a housing having a boss extending from a surface thereof;

a plurality of transducers supported by said housing to measure a plurality of vehicle parameters and generate outputs related to the vehicle parameters; and at least one input directly connected to said boss.

40. An apparatus according to claim 39 wherein said boss has at least one aperture.

41. An apparatus according to claim 39 wherein said transducers include at least one pressure sensor.

42. An apparatus according to claim 39 further including a circuit mounted in said housing and connected to said transducers to provide common signal compensation for said outputs.

43. An apparatus according to claim 42 wherein said circuit includes a common temperature compensating circuit.

44. A hydraulic control valve comprising:

a control valve body having a plurality of passageways formed therein, said valve body further having a plurality of pressure sensing ports formed in a surface of said valve body, said pressure sensing ports communicating with selected portions of said passageways;

a housing attached to said valve body, said housing having a plurality of bores formed therein, said bores communicating with said valve body pressure sensing ports;

a plurality of pressure sensors carried by said housing; each of said pressure sensors disposed in one of said housing bores and corresponding to one of said pressure sensing ports, each of said pressure sensors operative to sense the pressure of a fluid in said pressure port;

a signal conditioning circuit carried by said housing, said signal conditioning circuit being operable to sample each of said pressure sensors and generate an analog multiplexed signal which includes said pressure sensor signals; and a microprocessor included in said signal conditioning circuit, said microprocessor being operable to convert said analog multiplexed signal into a serial digital signal, said microprocessor being connected to an electro-hydraulic brake system microprocessor, said microprocessor transmitting said serial data signal to said electro-hydraulic brake system microprocessor and further wherein said electro-hydraulic brake system microprocessor is operable to compensate said multiplexed output signal.

45. An apparatus for measuring fluid pressures, said apparatus including:

a housing;

a plurality of pressure sensors mounted on said housing, each of said pressure sensors including a pressure sensing element and an electrical output connected to said pressure sensing element;

a plurality of fluid pressure inputs connected to said pressure sensors, respectively; and a circuit mounted in said housing and in electrical connection with said electrical outputs to provide a common signal compensation for said pressure sensors.

46. An apparatus for measuring fluid pressures, said apparatus including:

a housing;

a plurality of pressure sensors mounted on said housing along a common axis, each of said pressure sensors including a pressure sensing element and an electrical output connected to said pressure sensing element;

a plurality of fluid pressure inputs connected to said pressure sensors, respectively; and a circuit mounted in said housing in electrical connection with said electrical outputs, said circuit including a digitizing circuit providing a common signal compensation for said pressure sensors.

* * * * *